(12) United States Patent
Martin et al.

(10) Patent No.: US 12,204,138 B2
(45) Date of Patent: Jan. 21, 2025

(54) SHAPED PART

(71) Applicant: Novem Car Interior Design GmbH, Vorbach (DE)

(72) Inventors: Alexander Martin, Neuhaus an der Pegnitz (DE); Philipp Weih, Haag (DE)

(73) Assignee: NOVEM CAR INTERIOR DESIGN GMBH, Vorbach (DE)

( * ) Notice: Subject to any disclaimer, the term of this patent is extended or adjusted under 35 U.S.C. 154(b) by 0 days.

(21) Appl. No.: 18/448,661

(22) Filed: Aug. 11, 2023

(65) Prior Publication Data

US 2024/0053528 A1 Feb. 15, 2024

(30) Foreign Application Priority Data

Aug. 11, 2022 (DE) .......................... 102022120363.8

(51) Int. Cl.
*F21V 8/00* (2006.01)

(52) U.S. Cl.
CPC ........... *G02B 6/006* (2013.01); *G02B 6/0088* (2013.01)

(58) Field of Classification Search
CPC ........ G02B 6/0088; G02B 6/006; B60Q 3/66; B60Q 3/64; B60Q 3/62
See application file for complete search history.

(56) References Cited

FOREIGN PATENT DOCUMENTS

| DE | 102012215165 A1 * | 2/2014 | ............... B60Q 3/14 |
|---|---|---|---|
| DE | 102020129386 | 2/2022 | |
| EP | 3572282 | 11/2019 | |

OTHER PUBLICATIONS

Innovation Q+ NPL Search (Year: 2024).*

* cited by examiner

*Primary Examiner* — Anabel Ton
(74) *Attorney, Agent, or Firm* — Workman Nydegger

(57) ABSTRACT

A shaped part includes a decorative layer having a front/visible side, and a rear opposing side, a light guide assembly arranged on the rear side of the decorative layer for illuminating and/or backlighting the decorative layer, and one or more light sources. Light (L) emanating from the light source(s) can be input into the light guide assembly. The light guide assembly has a light guide layer with a front side and a rear side. An at least sectionally translucent mirror film is arranged on the front side of the light guide layer and a rear-side mirror film is arranged on the rear side of the light guide layer. Light (L) emanating from the light source(s) and input into the light guide layer of the light guide assembly can be partially reflected on the mirror films, and thus propagates in the light guide layer.

22 Claims, 2 Drawing Sheets

SHAPED PART

CROSS-REFERENCE TO RELATED APPLICATIONS

The present invention claims the benefit of priority to German Patent Application No. 10 2022 120 363.8, filed Aug. 11, 2022, the entire content of which is incorporated herein by reference.

BACKGROUND

1. Technical Field

The invention relates to a shaped part, in particular a decorative part and/or panel part designed as a shaped part for the vehicle interior.

2. Related Art

Numerous decorative and panel parts are installed in the vehicle interior, for example door panels, console panels, and instrument panels. The decorative and panel parts also include control buttons and their covers.

Backlight and/or illumination functions are often desired in such decorative and panel parts. Up to now, they have usually been realized by means of an additional light box or a light module on the rear side of the component. However, such light boxes or light modules are relatively space-intensive additional parts which moreover must be sometimes purchased additionally. Furthermore, the light boxes have to be installed in a frame, wherein—due to its geometry—said frame rules out backlighting over the whole surface of the component. Also, the light boxes or light-conducting modules must be newly developed or designed for each component.

As regards prior art, reference is made to DE 10 2020 129 386 A1 and EP 3 572 282 A1.

The object of the invention is to provide a new shaped part, in particular a shaped part in which backlight and/or illumination functions are realized such that the aforementioned disadvantages of the prior art are avoided at least for the most part.

BRIEF SUMMARY

This object is achieved by a shaped part having the features of claim 1. Advantageous embodiments and further developments are provided in the dependent claims.

The shaped part according to the invention comprises a decorative layer having a front side designed as a visible side and a rear side opposite the front side, a light guide assembly arranged on the rear side of the decorative layer for illuminating and/or backlighting the decorative layer, one or more light sources, wherein light emanating from the light source(s) is or can be input into the light guide assembly. The light guide assembly has a light guide layer with a front side and a rear side, wherein a front-side, at least sectionally translucent mirror film is arranged on the front side of the light guide layer and a rear-side mirror film is arranged on the rear side of the light guide layer, wherein light emanating from the light source(s) and coupled into the light guide layer of the light guide assembly is at least partially reflected on the mirror films and thus propagates in the light guide layer.

The advantages of the invention are in particular that illumination over the whole surface of the component up to the component edge is possible. Furthermore, the shaped part can be manufactured without additional light boxes or light modules. In addition, a high variance of the illumination and/or backlight functions is possible with the present invention.

The decorative layer can be translucent. If the decorative layer is designed to be opaque, it must have through-holes for transmitting light to the front side of the decorative layer.

The front-side mirror film preferably comprises an, in particular transparent, carrier film with a mirror layer applied thereto. The mirror layer is applied to the carrier film in particular by means of printing methods and/or vapor deposition and/or extrusion. The mirror layer can be applied to the front side of the carrier film facing the decorative layer. Alternatively, it can also be provided for the mirror layer to be applied to the rear side of the carrier film facing away from the decorative layer.

The light guide layer is preferably made of a light-conducting and/or transparent plastic, in particular a one-component plastic, preferably polycarbonate (PC) or polymethyl methacrylate (PMMA). The plastic of the light guide layer is preferably injected between the front-side mirror layer and the rear-side mirror layer. Alternatively, the light-conducting and/or transparent plastic for forming the light guide layer, the front-side mirror layer and the rear-side mirror layer can also be pressed together or connected by means of lamination. Pressing or lamination can also take place together with the decorative layer and/or further layers, for example the stabilizing layer described below and/or the adhesive layer(s).

The decorative layer preferably comprises wood, in particular wood veneer, and/or woven fabric and/or carbon and/or stone and/or plastic and/or ceramic and/or metal, or is made of wood, in particular wood veneer, and/or woven fabric and/or carbon and/or stone and/or plastic and/or ceramic and/or metal.

According to one embodiment variant of the invention, a stabilizing layer is arranged on the rear side of the decorative layer between the decorative layer and the light guide assembly, wherein the stabilizing layer preferably comprises a nonwoven arranged on the rear side of the decorative layer by means of an adhesive layer. The adhesive layer and/or the nonwoven are preferably white in order to scatter and/or reflect light back to the light guide layer.

The light guide assembly is arranged on the rear side of the decorative layer in particular by means of a subbing layer. For example, during production, the front-side mirror film can be applied by means of a pressing process or hot lamination process, and then the light guide layer forms, for example as described above. However, the front-side mirror film can also be applied to the decorative layer by means of joining during injection molding, during formation of the light guide layer by means of injection molding. If a stabilizing layer is provided, the light guide assembly can be applied to the rear side of the stabilizing layer by means of a subbing layer, and can thus be, in particular, arranged indirectly on the rear side of the decorative layer.

Particularly preferably, the shaped part has a carrier, wherein the carrier is arranged on the rear side of the light guide assembly. The carrier is preferably a plastic carrier, in particular a two-component plastic carrier, which is injection-molded onto the rear side of the light guide assembly by means of injection molding. Alternatively, the carrier and the semifinished decorative layer/light guide assembly product can also be pressed together. The carrier can optionally be white to scatter and/or reflect light back to the light guide layer.

According to one embodiment variant of the invention, the decorative layer has one or more through-holes, in particular for displaying a symbol on the front side of the decorative layer, wherein the through-holes extend from the rear side of the decorative layer to the front side of the decorative layer and through the decorative layer.

Such a symbol is preferably one or more functional symbols or geometries or shapes or conformal lines which are displayed on the visible side of the decorative layer of the shaped part, i.e., which are visible as such in particular in plan view of the visible side of the decorative layer. Furthermore, the symbol can also be one or more letters, logotypes, characters or other design elements.

If a stabilizing layer is provided, the through-holes can also extend through the stabilizing layer and/or subbing layer.

The one or more through-holes can be introduced, for example, by means of a laser from the front side of the decorative layer into the decorative layer and any adjoining layers, such as the stabilizing layer and/or the adhesive layer and/or the subbing layer.

It can be provided for the front-side mirror film to extend at least in sections into the through-holes. When the plastic of the light guide layer is injected between the front-side mirror film and the rear-side mirror film, the plastic presses the front-side mirror film at least in sections into the through-holes of the decorative layer.

According to one embodiment variant, the front-side mirror film can be designed to be opaque with partially translucent regions, wherein the partially translucent regions form in particular a symbol. The translucent regions can be formed, for example, by thinning the front-side mirror film in these regions. Thinning can take place, for example, by means of lasers.

The rear-side mirror film preferably comprises an, in particular transparent, carrier film with a mirror layer applied thereto. The mirror layer is applied to the carrier film in particular by means of printing methods and/or vapor deposition and/or extrusion. The mirror layer can be applied to the front side of the carrier film facing away from the decorative layer. Alternatively, it can also be provided for the mirror layer to be applied to the rear side of the carrier film facing the decorative layer. The rear-side mirror film can be designed to be both translucent and opaque.

According to a development of the invention, output elements for outputting light out of the light guide layer are arranged on the front side or on the rear side of the carrier film of the rear-side mirror film.

Provision can be made for the output elements, in particular in plan view of the rear-side mirror film, to form a symbol which is or can be represented as an illuminated symbol on the front side of the decorative layer.

The output elements are formed, in particular, by a light-scattering, preferably white, lacquer, wherein the light-scattering lacquer is partially applied to the rear-side mirror film, in particular the carrier film of the rear-side mirror film, and thus interrupts, in sections, in particular the mirror layer of the rear-side mirror film. The light-scattering lacquer can be applied to the mirror film by means of screen printing or vapor deposition.

The light-scattering lacquer can in each case be applied in sections to the rear-side mirror film in the region of one of the through-holes. This means in particular that, in a plan view of the front side of the decorative layer, the through-holes and the corresponding output elements are arranged at least substantially congruently, wherein through-holes and corresponding output elements do not necessarily have to be the same size. The light-scattering lacquer can also be applied in each case in the region of the translucent regions of the opaque, front-side mirror film.

According to one embodiment variant of the invention, a plurality of output elements are provided, wherein each output element generates an illuminated region on the front side of the decorative layer, wherein the output elements have a designated arrangement on the carrier film of the rear-side mirror film so that the illuminated regions produced by the output elements have a corresponding arrangement on the front side of the decorative layer. "Illuminated region" is to be understood in particular not only to mean that only this region is illuminated; rather, the complete area of the decorative layer is preferably backlit and the illuminated regions are illuminated more and/or more intensively. The illuminated region can be a light spot, for example.

The designated and/or corresponding arrangement can be, for example, holohedral or hemihedral or in sections or symbol-like. Holohedral preferably means that the illuminated regions are distributed over the full area of the front side of the decorative layer. Hemihedral preferably means that the illuminated regions are arranged only in one half of the full area of the front side of the decorative layer, wherein the term "half" includes a deviation of +/−20% to the exact half. "In sections" preferably means that the illuminated regions are provided only in certain sections of the area of the front side of the decorative layer, for example alternating sections with and without illuminated regions. However, fields with illuminated regions could also be provided, wherein sections without illuminated regions are provided between the fields. Symbol-like preferably means that the illuminated regions form a symbol in the area of the front side of the decorative layer, for example one or more letters, one or more characters or one or more functional symbols.

The illuminated regions preferably become larger with increasing distance from the light source(s).

According to a development of the invention, the shaped part has one or more input elements for inputting the light emanating from the light source(s) into the light guide layer. The input element(s) are preferably arranged or formed on one or more side surfaces of the light guide layer. The input elements can be arranged on one side, on both sides or on a plurality of sides on the side surfaces of the light guide layer. The input elements are designed, for example, as latches. In general, the input elements can be designed to correspond to the light sources, namely such that the light sources can be attached to the input elements by means of latching and/or mounting.

It can be provided that a protective and/or optical layer, in particular of polyurethane (PUR), is provided on the front side of the decorative layer. The protective and/or optical layer is in particular a high-gloss layer. Alternatively, the front side of the decorative layer can also be designed to be open-pored.

BRIEF DESCRIPTION OF THE DRAWINGS

The invention is explained in more detail below also with regard to further features and advantages on the basis of the description of exemplary embodiments and with reference to the accompanying schematic drawing, in which.

Corresponding parts and components are also identified with the same reference numbers in each of the various embodiments.

DETAILED DESCRIPTION

Figure 1:
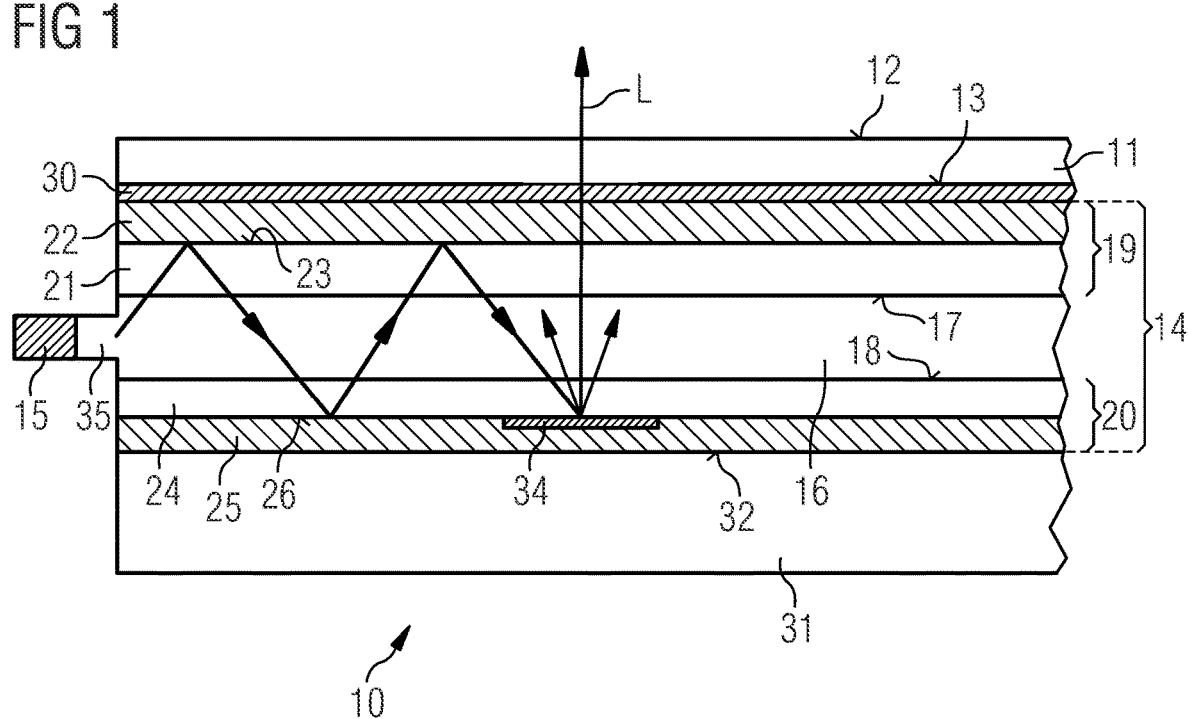
FIG. 1 shows a schematic sectional representation of a detail of a first exemplary embodiment of a shaped part according to the invention.
Figure 2:
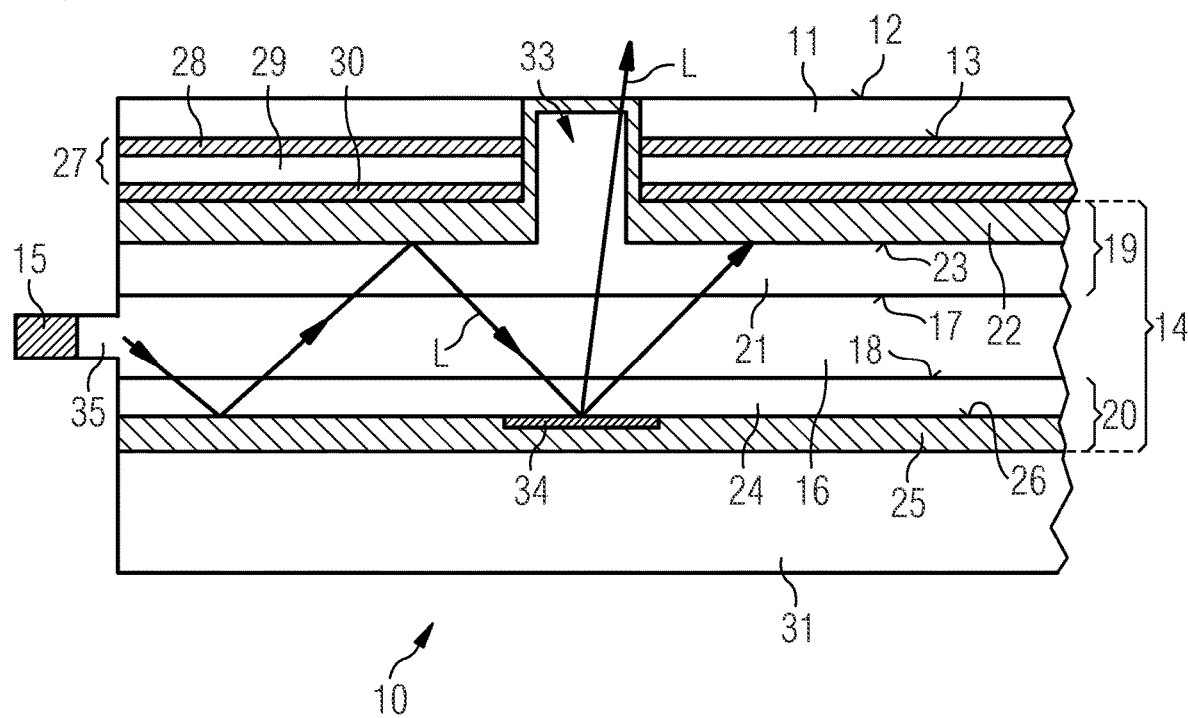
FIG. 2 shows a schematic sectional representation of a detail of a second exemplary embodiment of a shaped part according to the invention.

FIG. 1 to FIG. 3d each show an exemplary embodiment of a decorative and/or panel part according to the invention designed as a shaped part 10 for a vehicle interior. The shaped part 10 comprises a decorative layer 11 with a front side 12 designed as a visible side and a rear side 13 opposite the front side 12, and a light guide assembly 14 arranged on the rear side 13 of the decorative layer 11 for illuminating and/or backlighting the decorative layer 11. The shaped part 10 further comprises multiple light sources 15, wherein light L emanating from the light sources 15, which in FIG. 1 and FIG. 2 is shown by arrows by way of example, is coupled into the light guide assembly 14.

As can be seen in FIG. 1 and FIG. 2, the light guide assembly 14 has a light guide layer 16 with a front side 17 and a rear side 18, wherein a front-side, translucent mirror film 19 is arranged on the front side 17 of the light guide layer 16 and a rear-side mirror film 20 is arranged on the rear side 18 of the light guide layer 16. Light L emanating from the light sources 15 and coupled into the light guide layer 16 of the light guide assembly 14 is reflected on the mirror films 19, 20 and thus propagates in the light guide layer 16.

According to the exemplary embodiment of FIG. 1, the shaped part 10 comprises a translucent decorative layer 11. The decorative material of the decorative layer 11 can be wood, in particular wood veneer, woven fabric, carbon, stone, plastic, ceramic or metal or mixed forms of these materials.

The light guide assembly 14 comprises a front-side mirror film 19 and a rear-side mirror film 20 that enclose a light guide layer 16 in a sandwich-like structure. The front-side mirror film 19 comprises a carrier film 21 with a mirror layer 22 applied thereto, wherein the mirror layer 22 is applied to the front side 23 of the carrier film 21 facing the decorative layer 11. The rear-side mirror film 20 also comprises a carrier film 24 with a mirror layer 25 applied thereto, wherein the mirror layer 25 is applied to the rear side 26 of the carrier film 24 facing away from the decorative layer 11. The mirror layers 22, 25 are in particular each applied to the carrier films 21, 24 by means of printing methods, vapor deposition or extrusion. The front-side mirror film 19 is translucent, the rear-side mirror film 20 can be designed to be translucent or opaque. The light guide layer 16 is made of a light-conducting, transparent one-component plastic, preferably polycarbonate (PC) or polymethyl methacrylate (PMMA). The plastic of the light guide layer 16 is injected between the front-side mirror layer 19 and the rear-side mirror layer 20 to produce the light guide assembly 14. The light guide assembly 14 is, in turn, arranged on the rear side 13 of the decorative layer 11 by means of a subbing layer 30, for example by joining or pressing.

Output elements 34 for outputting light L out of the light guide layer 16 are arranged on the rear side of the carrier film 24, in particular in or below the mirror layer 25, of the rear-side mirror film 20. The output elements 34 are formed by a light-scattering, white lacquer, which is partially applied to the carrier film 24 of the rear-side mirror film 20, thereby interrupting the mirror layer 25 of the rear-side mirror film 20 in sections. The light-scattering lacquer can be applied to the mirror film 20 by means of screen printing or vapor deposition. The partially applied output elements 34 can form, for example, a symbol which is represented as such by light spots 36 on the front side 12 of the decorative layer 11. The symbol is visible as such in particular in plan view of the front side 12 of the decorative layer 11, as shown for example in FIG. 3d.

The shaped part 10 has a plurality of input elements 35 for inputting the light L emanating from the light sources 15 into the light guide layer 16. According to the exemplary embodiment of FIG. 1, the input elements 35 are arranged on a side surface of the light guide layer 16. The input elements 35 are preferably formed or configured as such during formation of the light guide layer 16. The input elements 35 can be, for example, latches that correspond to the light sources 15 so that they can be attached in a simple manner by means of latching and/or mounting.

The shaped part 10 moreover has a carrier 31, wherein the carrier 31 is arranged on the rear side 32 of the light guide assembly 14. The carrier 31 is a plastic carrier, in particular a two-component plastic carrier, which is injection-molded onto the rear side 32 of the light guide assembly 14 by means of injection molding. Alternatively, the carrier 31 and the semifinished decorative layer/light guide assembly product can also be pressed together. The carrier 31 can optionally be white to scatter and/or reflect light back to the light guide layer 16.

According to the exemplary embodiment of FIG. 1, the front side 12 of the decorative layer 11 is designed to be open-pored. Alternatively, a protective and/or optical layer made of polyurethane (PUR) formed as a high-gloss layer can be applied to the front side 12 of the decorative layer 11.

According to the exemplary embodiment of FIG. 2, the shaped part 10 comprises an opaque decorative layer 11. The decorative material of the decorative layer 11 can be wood, in particular wood veneer, woven fabric, carbon, stone, plastic, ceramic or metal or mixed forms of these materials.

A stabilizing layer 27 is arranged on the rear side 13 of the decorative layer 11 between the decorative layer 11 and the light guide assembly 14, wherein the stabilizing layer 27 comprises a nonwoven 29 arranged on the rear side 13 of the decorative layer 11 by means of an adhesive layer 28. The adhesive layer 28 and the nonwoven 29 can be white in order to scatter or reflect light back to the light guide layer. The light guide assembly 14 is, in turn, attached to the rear side of the stabilizing layer 27 by means of a subbing layer 30.

To display a symbol on the front side 12 of the decorative layer 11, the decorative layer 11 has a plurality of through-holes 33, wherein FIG. 2 merely shows one through-hole 33 by way of example. The through-holes 33 each extend from the rear side 13 of the decorative layer 11 to the front side 12 of the decorative layer 11 and through the decorative layer 11. Furthermore, the through-holes 33 also extend through the stabilizing layer 27 and the subbing layer 30. The through-holes 33 can be introduced, for example, by means of a laser from the front side 12 of the decorative layer 11 into the decorative layer 11 and adjacent layers, such as the stabilizing layer 27 and any adhesive or subbing layers 28, 30.

The light guide assembly 14 comprises a front-side mirror film 19 and a rear-side mirror film 20 also according to the exemplary embodiment of FIG. 2, which enclose a light guide layer 16 in a sandwich-like structure. The front-side mirror film 19 comprises a carrier film 21 with a mirror layer 22 applied thereto, wherein the mirror layer 22 is applied to the front side 23 of the carrier film 21 facing the decorative layer 11. The rear-side mirror film 20 also comprises a carrier film 24 with a mirror layer 25 applied thereto, wherein the mirror layer 25 is applied to the rear side 26 of the carrier film 24 facing away from the decorative layer 11. The front-side mirror film 19 is translucent, the rear-side mirror film 20 can be designed to be translucent or opaque. The light guide layer 16 is made of a light-conducting, transparent one-component plastic, preferably polycarbonate (PC) or polymethyl methacrylate (PMMA).

The plastic of the light guide layer 16 is injected between the front-side mirror layer 19 and the rear-side mirror layer 20 to produce the light guide assembly 14. When the plastic of the light guide layer 16 is injected between the front-side mirror film 19 and the rear-side mirror film 20, the plastic presses the front-side mirror film 19 at least in sections into the through-holes 33 of the decorative layer 11 so that the front-side mirror film 19 extends at least in sections into the through-holes 33.

Output elements 34 for outputting light L out of the light guide layer 16 are arranged on the rear side of the carrier film 24 of the rear-side mirror film 20. The output elements 34 are formed by a light-scattering, white lacquer. The light-scattering lacquer is applied partially to the carrier film 24 of the rear-side mirror film 20, wherein the light-scattering lacquer is applied to the rear-side mirror film 20 in each case in the region of one of the through-holes 33, i.e., substantially opposite the through-hole.

The shaped part 10 according to the exemplary embodiment of FIG. 2 has a plurality of input elements 35 for inputting the light L emanating from the light sources 15 into the light guide layer 16. According to the exemplary embodiment of FIG. 2, the input elements 35 are arranged on a side surface of the light guide layer 16.

The shaped part 10 moreover has a carrier 31, wherein the carrier 31 is arranged on the rear side 32 of the light guide assembly 14. The carrier 31 is a plastic carrier, in particular a two-component plastic carrier, which is injection-molded onto the rear side 32 of the light guide assembly 14 by means of injection molding. Alternatively, the carrier 31 and the semifinished decorative layer/light guide assembly product can also be pressed together. The carrier 31 can optionally be white to scatter and/or reflect light back to the light guide layer 16.

FIGS. 3a to 3d each show different exemplary embodiments of the shaped part 10 according to the invention in a schematic plan view. According to the exemplary embodiments of FIG. 3a, FIG. 3b and FIG. 3d, a plurality of output elements 34 are provided in each case, wherein each output element 34 generates an illuminated region 36 on the front side 12 of the decorative layer 11. The illuminated regions 36 are each light spots. According to the exemplary embodiment of FIG. 3c, no output elements 34 are provided. The output elements 34 according to the exemplary embodiments of FIG. 3a, FIG. 3b and FIG. 3d each have a designated arrangement on the carrier film 24 of the rear-side mirror film 20, so that the illuminated regions 36 produced by the output elements 34 have a corresponding arrangement on the front side 12 of the decorative layer 11.

Figure 3A:
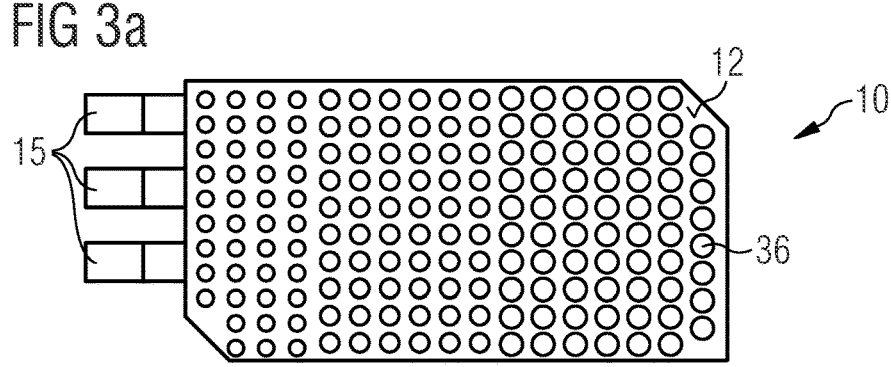
FIG. 3a shows a schematic plan view of a third exemplary embodiment of a shaped part according to the invention.

The designated or corresponding arrangement according to the exemplary embodiment of FIG. 3a is holohedral. Holohedral means that the illuminated regions 36 are distributed over the full area of the front side 12 of the decorative layer 11. FIG. 3a shows that for reasons of efficiency, the illuminated regions 36 become larger with increasing distance from the light sources 15. However, a uniform size would also be possible.

Figure 3B:
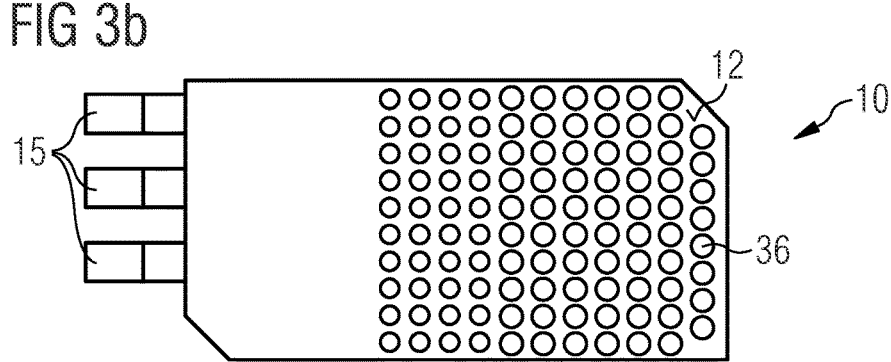
FIG. 3b shows a schematic plan view of a fourth exemplary embodiment of a shaped part according to the invention.
Figure 3C:
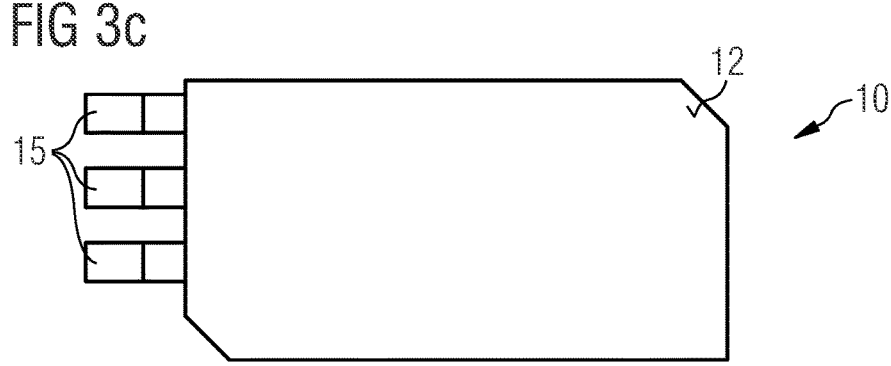
FIG. 3c shows a schematic plan view of a fifth exemplary embodiment of a shaped part according to the invention.

The designated or corresponding arrangement according to the exemplary embodiment of FIG. 3b is hemihedral. Hemihedral means that the illuminated regions 36 are arranged only in one half of the full area of the front side 12 of the decorative layer 11, wherein "half" includes a deviation of +/−20% to the exact half. Moreover, the illuminated regions 36 become larger with increasing distance from the light sources 15.

Figure 3D:
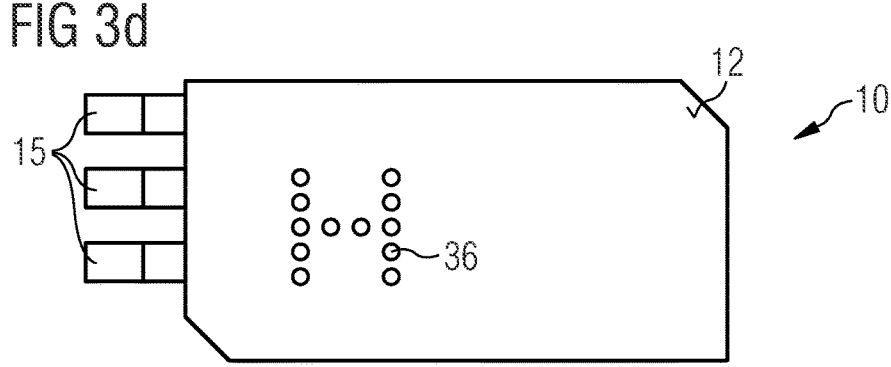
FIG. 3d shows a schematic plan view of a sixth exemplary embodiment of a shaped part according to the invention.

The designated or corresponding arrangement according to the exemplary embodiment of FIG. 3d is symbol-like. Symbol-like means that the illuminated regions 36 form a symbol in the area of the front side 12 of the decorative layer 11. According to the exemplary embodiment of FIG. 3d, the letter "H" is shown.

LIST OF REFERENCE SKINS

10 Shaped part
11 Decorative layer
12 Front side (decorative layer)
13 Rear side (decorative layer)
14 Light guide assembly
15 Light source
16 Light guide layer
17 Front side (light guide layer)
18 Rear side (light guide layer)
19 Front-side mirror film
20 Rear-side mirror film
21 Carrier film
22 Mirror layer
23 Front side (carrier film)
24 Carrier film
25 Mirror layer
26 Rear side (carrier film)
27 Stabilizing layer
28 Adhesive layer
29 Nonwoven
30 Subbing layer
31 Carrier
32 Rear side (light guide assembly)
33 Through-hole
34 Output element
35 Input element
36 Illuminated region

We claim:

1. A shaped part comprising:
a decorative layer having a front side designed as a visible side and a rear side opposite the front side,
a light guide assembly arranged on the rear side of the decorative layer for illuminating and/or backlighting the decorative layer, and
one or more light sources;
wherein:
light (L) emanating from the light source(s) is or can be input into the light guide assembly,
the light guide assembly has a light guide layer with a front side and a rear side,
a front-side, at least sectionally translucent mirror film is arranged on the front side of the light guide layer and a rear-side mirror film is arranged on the rear side of the light guide layer,
light (L) emanating from the light source(s) and coupled into the light guide layer of the light guide assembly is at least partially reflected on the mirror films and thus propagates in the light guide layer;
the front-side mirror film comprises a carrier film with a mirror layer applied thereto; and
the mirror layer is applied to the front side of the carrier film facing the decorative layer.

2. The shaped part according to claim 1, wherein:
the light guide layer is made of a light-conducting and/or transparent plastic.

3. The shaped part according to claim 1, wherein the decorative layer:
comprises wood and/or woven fabric and/or carbon and/or stone and/or plastic and/or ceramic and/or metal, or
is made of wood and/or woven fabric and/or carbon and/or stone and/or plastic and/or ceramic and/or metal.

4. The shaped part according to claim 1, wherein:
a stabilizing layer is arranged on the rear side of the decorative layer between the decorative layer and the light guide assembly.

5. The shaped part according to claim 1, wherein:
the light guide assembly is arranged on the rear side of the decorative layer by means of a subbing layer.

6. The shaped part according to claim 1, wherein:
the shaped part has a carrier; and
the carrier is arranged on the rear side of the light guide assembly.

7. The shaped part according to claim 1, wherein:
the decorative layer has one or more through-holes, and
the through-holes extend from the rear side of the decorative layer to the front side of the decorative layer and through the decorative layer.

8. The shaped part according to claim 7, wherein:
the front-side mirror film extends at least in sections into the through-holes.

9. The shaped part according to claim 1, wherein:
the front-side mirror film is designed to be opaque with partially translucent regions.

10. The shaped part according to claim 1, wherein:
the rear-side mirror film comprises a carrier film with a mirror layer applied thereto.

11. The shaped part according to claim 10, wherein:
the mirror layer is applied to the rear side of the carrier film facing away from the decorative layer.

12. The shaped part according to claim 10, wherein:
output elements for outputting light (L) out of the light guide layer are arranged on the front side or on the rear side of the carrier film of the rear-side mirror film.

13. The shaped part according to claim 12, wherein:
the output elements are formed by a light-scattering lacquer, and
the light-scattering lacquer is partially applied to the rear-side mirror film.

14. The shaped part according to claim 12, wherein:
a plurality of output elements are provided,
each output element generates an illuminated region on the front side of the decorative layer, and
the output elements have a designated arrangement on the carrier film of the rear-side mirror film so that the illuminated regions produced by the output elements have a corresponding arrangement on the front side of the decorative layer.

15. The shaped part according to claim 1, wherein:
the shaped part has one or more input elements for inputting the light (L) emanating from the light source(s) into the light guide layer.

16. The shaped part according to claim 1, wherein:
a protective and/or optical layer is provided on the front side of the decorative layer.

17. A shaped part comprising:
a decorative layer having a front side designed as a visible side and a rear side opposite the front side,
a light guide assembly arranged on the rear side of the decorative layer for illuminating and/or backlighting the decorative layer, and
one or more light sources;
wherein:
light (L) emanating from the light source(s) is or can be input into the light guide assembly,
the light guide assembly has a light guide layer with a front side and a rear side,
a front-side, at least sectionally translucent mirror film is arranged on the front side of the light guide layer and a rear-side mirror film is arranged on the rear side of the light guide layer,
light (L) emanating from the light source(s) and coupled into the light guide layer of the light guide assembly is at least partially reflected on the mirror films and thus propagates in the light guide layer;
the light guide assembly is arranged on the rear side of the decorative layer by means of a subbing layer.

18. A shaped part comprising:
a decorative layer having a front side designed as a visible side and a rear side opposite the front side,
a light guide assembly arranged on the rear side of the decorative layer for illuminating and/or backlighting the decorative layer, and
one or more light sources;
wherein:
light (L) emanating from the light source(s) is or can be input into the light guide assembly,
the light guide assembly has a light guide layer with a front side and a rear side,
a front-side, at least sectionally translucent mirror film is arranged on the front side of the light guide layer and a rear-side mirror film is arranged on the rear side of the light guide layer,
light (L) emanating from the light source(s) and coupled into the light guide layer of the light guide assembly is at least partially reflected on the mirror films and thus propagates in the light guide layer;
the decorative layer has one or more through-holes;
the through-holes extend from the rear side of the decorative layer to the front side of the decorative layer and through the decorative layer; and
the front-side mirror film extends at least in sections into the through-holes.

19. A shaped part comprising:
a decorative layer having a front side designed as a visible side and a rear side opposite the front side,
a light guide assembly arranged on the rear side of the decorative layer for illuminating and/or backlighting the decorative layer, and
one or more light sources;
wherein:
light (L) emanating from the light source(s) is or can be input into the light guide assembly,
the light guide assembly has a light guide layer with a front side and a rear side,
a front-side, at least sectionally translucent mirror film is arranged on the front side of the light guide layer and a rear-side mirror film is arranged on the rear side of the light guide layer, light (L) emanating from the light source(s) and coupled into the light guide layer of the light guide assembly is at least partially reflected on the mirror films and thus propagates in the light guide layer; and the front-side mirror film is designed to be opaque with partially translucent regions.

20. A shaped part comprising:

a decorative layer having a front side designed as a visible side and a rear side opposite the front side, a light guide assembly arranged on the rear side of the decorative layer for illuminating and/or backlighting the decorative layer, and one or more light sources;

wherein:

light (L) emanating from the light source(s) is or can be input into the light guide assembly, the light guide assembly has a light guide layer with a front side and a rear side, a front-side, at least sectionally translucent mirror film is arranged on the front side of the light guide layer and a rear-side mirror film is arranged on the rear side of the light guide layer, light (L) emanating from the light source(s) and coupled into the light guide layer of the light guide assembly is at least partially reflected on the mirror films and thus propagates in the light guide layer; and the rear-side mirror film comprises a carrier film with a mirror layer applied thereto.

21. A shaped part comprising:

a decorative layer having a front side designed as a visible side and a rear side opposite the front side, a light guide assembly arranged on the rear side of the decorative layer for illuminating and/or backlighting the decorative layer, and one or more light sources;

wherein:

light (L) emanating from the light source(s) is or can be input into the light guide assembly, the light guide assembly has a light guide layer with a front side and a rear side, a front-side, at least sectionally translucent mirror film is arranged on the front side of the light guide layer and a rear-side mirror film is arranged on the rear side of the light guide layer, light (L) emanating from the light source(s) and coupled into the light guide layer of the light guide assembly is at least partially reflected on the mirror films and thus propagates in the light guide layer; and the shaped part has one or more input elements for inputting the light (L) emanating from the light source(s) into the light guide layer.

22. A shaped part comprising:

a decorative layer having a front side designed as a visible side and a rear side opposite the front side, a light guide assembly arranged on the rear side of the decorative layer for illuminating and/or backlighting the decorative layer, and one or more light sources;

wherein:

light (L) emanating from the light source(s) is or can be input into the light guide assembly, the light guide assembly has a light guide layer with a front side and a rear side, a front-side, at least sectionally translucent mirror film is arranged on the front side of the light guide layer and a rear-side mirror film is arranged on the rear side of the light guide layer, light (L) emanating from the light source(s) and coupled into the light guide layer of the light guide assembly is at least partially reflected on the mirror films and thus propagates in the light guide layer; and a protective and/or optical layer is provided on the front side of the decorative layer.

* * * * *